United States Patent
Parke

[15] 3,673,422
[45] June 27, 1972

[54] LOSS OF SYNCHRONISM DETECTOR

[72] Inventor: Harry G. Parke, Brooklyn, N.Y.

[73] Assignee: Galbraith-Pilot Marine Corporation, Brooklyn, N.Y.

[22] Filed: Jan. 18, 1971

[21] Appl. No.: 107,283

[52] U.S. Cl..................................307/87, 318/85, 318/72, 318/78
[51] Int. Cl.........................................................H02j 1/00
[58] Field of Search ....................318/85, 72, 78; 307/85, 86, 307/87

[56] References Cited
UNITED STATES PATENTS 3,024,395   3/1962   Pedersen et al......................318/85 X

*Primary Examiner*—Herman J. Hohauser
*Attorney*—Imirie & Smiley

[57] ABSTRACT

A driving machine and a driven machine are to be kept in synchronism. Tachometer generators attached to both machines generate signals which charge a capacitor either positively or negatively with respect to a given reference, and should the charge on this capacitor increase above a certain level, a circuit breaker means opens the line connecting the armatures of the two machines.

13 Claims, 2 Drawing Figures

LOSS OF SYNCHRONISM DETECTOR

BACKGROUND OF THE INVENTION

The present invention relates to a detector for loss of synchronism and more particularly to providing actuator means responsive to a loss of synchronism detector between driven and driving synchronous ferromagnetic machines.

A specific field of application for the invention is for pumped energy storage systems in which the load on a utility is equalized by pumping water into a reservoir during the light load periods and permitting that water to flow out and generate electricity during heavy demand periods. In these systems, the same machine is used as either a motor or a generator, depending upon whether it is pumping water or being driven by the water flowing out of the reservoir. Because of well known electromagnetic design principles, these are usually large multi-pole machines. These machines have to be started and brought up to synchronous speed, as related to the frequency of the main power line, during each heavy load and light load period, generally at least twice a day.

The usual method is to start the machine as a motor and being driven by a much smaller generator connected to a water wheel. At the start of the start-up operation, both machines are standing still and both machines' turbines are shut off from the water. The large machine turbine is not connected to the water at any time during the start-up operation. With the armature windings of both machines connected, and the field windings of both machines energized, the gates leading water to the water wheel to the smaller machine are slowly opened. The water coming through the gates turns the smaller machine slowly and it in turn drives the larger machine which is operating at no load.

The water to the smaller machine's turbine is regulated so as to gradually accelerate both machines. It is important that both machines remain in synchronism through the start-up operation above very slow speeds. Should the smaller machine be accelerated too rapidly so that it pulls out of synchronism with the larger one, very large currents will flow in the armature connections and either or both machines and associated components will be serverely damaged. It is the purpose of the present invention to provide a means for very rapidly detecting this loss of synchronism and of opening circuit breakers connecting the armatures of the two machines before damage can result.

The requirement that the two machines be in synchronism is equivalent to a requirement that their speeds be in the same ratio as the number of poles on the two machines. Because of electromechanical design constraints the smaller machine used for start-up purposes will have a smaller number of poles than the larger one used for power generation, and the ratio between the two may very well not be an integer. A dangerous situation will exist with the loss of synchronism when one machine slips behind the other by a pole. This amounts to a phase difference, that is, an integral of frequency difference over time. Since the speeds of rotation of the two machines will vary from zero up to the line frequency synchronized speed or higher, an integrating system that is independent of frequency must be used.

There have been loss of synchronism detectors disclosed in the prior art, but these devices possess many disadvantages and shortcomings which are overcome by the present invention. For example, one of these prior art devices which disconnects a convertible motor-generator of A.C. type from the line upon gross loss of synchronism essentially shows a means of detecting loss of power to a synchronous machine by detecting the lengthening period that results. This system would not appear to have the advantages of the present device which depends upon counting the relative number of pulses in two pulse trains to determine whether or not the ratio of frequencies is a desired constant. The prior art device, on the other hand, merely determines the length of one period.

Many of the attendant advantages of the present invention will be readily appreciated as the same becomes better understood by reference to the following detailed description, when considered in connection with the accompanying drawings in which like reference numerals designate like parts throughout the Figures thereof, and wherein:

DETAILED DESCRIPTION OF THE INVENTION

The instant invention makes use of alternating current tachometer generators connected to the rotor of each machine. These devices, which are of wide general use for indicating the speed of rotation of machines, generate an A.C. voltage whose frequency is proportional to the speed at which the machine is turning. Since tachometer generators have a great many more poles than the large machines which are driving them, the frequency is considerably higher than the frequency being generated by the large machines.

Figure 1:
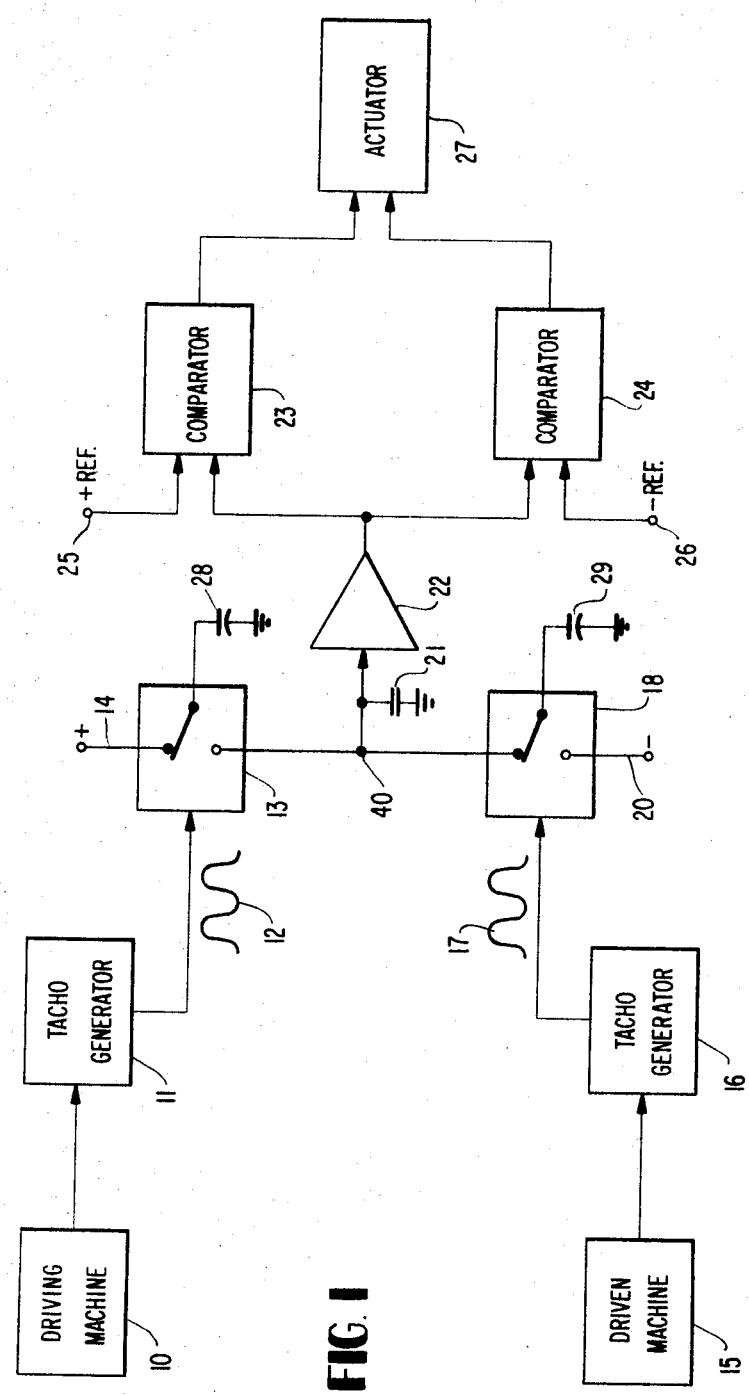
FIG. 1 shows a block diagram of the system; and,
FIG. 2 shows a detailed schematic of the device.

Referring now to FIG. 1, which shows a block diagram of the invention, there is shown a driving machine 10 whose output is connected to a tachometer generator 11, the output of the generator 11 being in the form of an alternating current signal 12, this signal being applied to a switch 13. The switch 13 also has an input to one fixed contact from a source of positive potential applied to terminal 14, a small capacitor 28 connected to the moveable contact, and an output from the other fixed contact to large capacitor 21. For the other arm of the circuit, there is shown a driven machine 15 whose output is connected to a tachometer generator 16, which produces an alternating current signal 17 which is applied to a second switch 18. Switch 18 also has a second input to one fixed contact from a source of negative potential applied to terminal 20, a small cap 29 connected to the moveable contact, and an output from the other fixed contact to 21. Fixed increments of positive and negative charge are drawn from 14 and 20 by 13,28 and 18,29 respectively and applied to 21 at rates determined by the frequencies of 12 and 17, respectively. A signal representative of the charge on condenser 21 passes through an amplifier 22, the output of the amplifier being divided and applied to a pair of comparators 23 and 24. Comparator 23 has a second input in the form of a positive reference potential from terminal 25, while comparator 24 has a negative reference potential from terminal 26 suppoed to its input. As will be described more fully hereinafter, these reference potentials from terminals 25 and 26 are chosen to set the limits at which the capacitor 21 may be charged to indicate the extent of non-synchronism between machines 10 and 15. Outputs from comparators 23 and 24 are applied to an actuator 27 which may take the form of an overload relay or switch which breaks a circuit (not shown) between the armatures of the machines 10 and 15, thereby preventing damage to these machines should there be a loss of synchronization.

Figure 2:
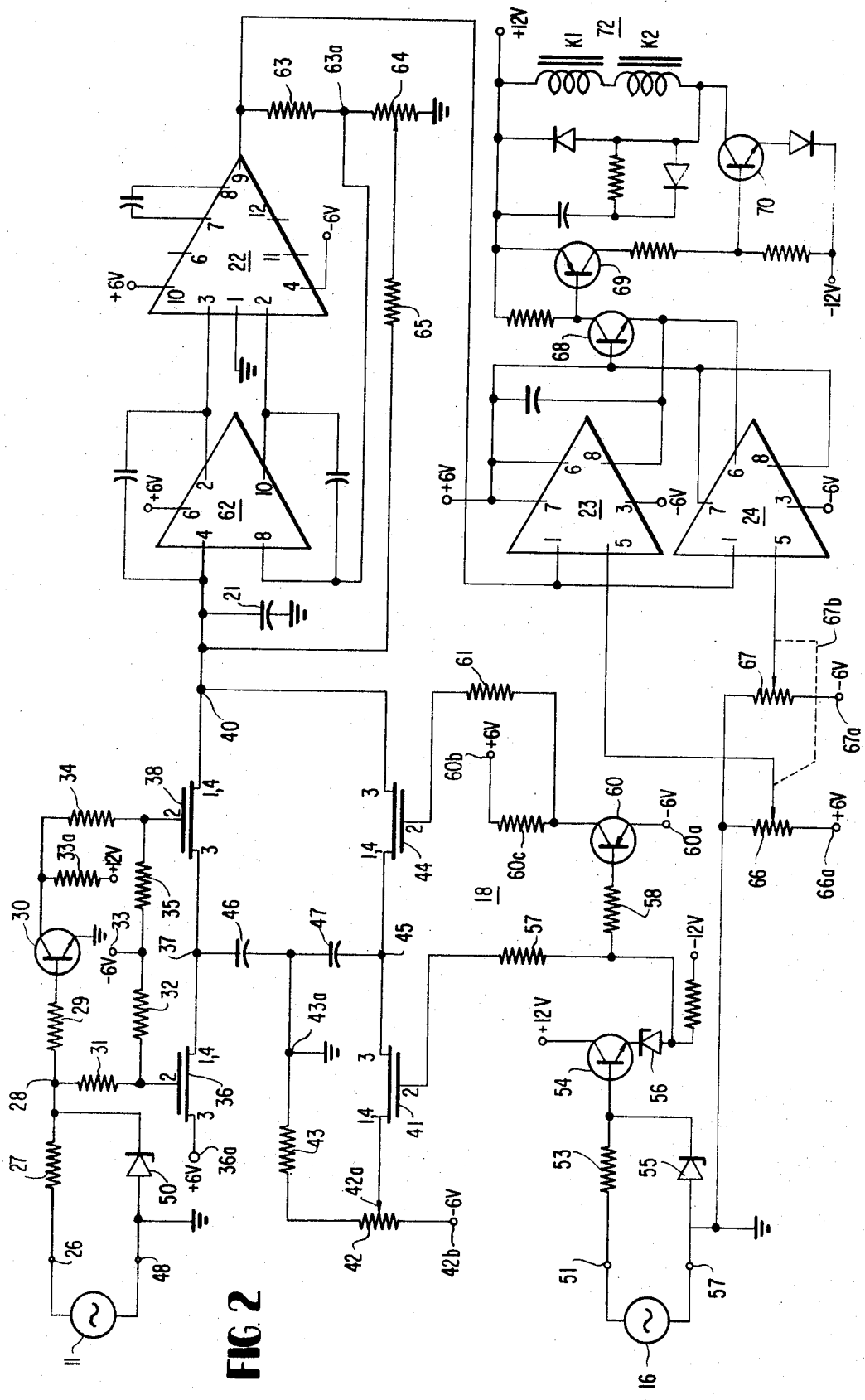

Referring now to FIG. 2 for a more detailed schematic of the loss of synchronization detector, there is shown the tachometer generator 11 for producing an A.C. signal. It should be noted here that the driving machine 10 and the driven machine 15 are not shown in FIG. 2 since actually it is the output of the tachometer generators 11 and 16 upon which the circuit depends. Tachometer generator 11 is applied to an input terminal 26 from where the signal passes through a fixed resistance 27 to a junction point 28. From junction 28 the signal then passes through a resistor 29 the the base of an NPN transistor 30. Also connected to junction 28 is a resistance 31 which is tied to another resistance 32 and thence to a terminal 33 for a source of negative potential. Positive potential is applied to the collector of transistor 30 through a resistance 33a, the potential likewise being applied to another resistance 34 in series with resistance 35 before returning to the negative potential terminal 33.

Connected to the junction between resistors 31 and 32 there is a field effect transistor 36, the base of the transistor being connected to the junction of the resistors while another electrode is connected to a terminal 36a of a source of positive potential and another electrode thereof is connected to a junction point 37. There is another field effect transistor 38 having its base connected to the junction between resistors 34 and 35, another electrode connected to terminal 37, and the other electrode connected to a terminal 40.

A third field effect transistor 41 has one electrode connected to a sliding arm 42a of a potentiometer 42, this resistor being connected to a series resistor 43 and thence to a ground terminal 43a. The second electrode of field effect transistor 41 is connected to a junction terminal 45, and this, in turn, is connected to one electrode of a fourth field effect transistor 44. Between junction points 37 and 45, there are connected two series connected condensers 46 and 47, the midpoint of these two condensers also being connected to ground terminal 43a. The second electrode of the field effect transistor 44 is connected to junction point 40. Returning briefly to the signal source 11, the second output from this device goes to a terminal 48, this terminal being connected to ground and also to the anode of a voltage regulating diode 50, the cathode of this diode being connected to junction point 28.

The second input to the system is the tachometer generator 16 which provides output to terminals 51 and 52, fixed resistor 53 couples the signal from terminal 51 to the base of a PNP transistor 54, while terminal 52 is connected to ground and also to the anode of voltage regulating diode 55. The cathode of this diode is also connected to the base of transistor 54. The emitter of transistor 54 is connected to the cathode of a diode 56, the anode of this diode in turn being connected through a fixed resistance 57 to the base electrode of field effect transistor 41. A resistance 58 has one end tied to the anode of diode 56 while its other end is connected to the base of a PNP transistor 60, the output of this transistor, by its collector, passes through a resistance 61 and is tied to the base of field effect transistor 44. The emitter of transistor 60 is connected to a terminal 60a for a negative potential. The collector is connected for a positive potential to a terminal 60b through a resistance 60c.

At junction 40, where the output of switches 13 and 18 are alternately impressed, the signals are applied to one terminal of a capacitance 21 and also to input pin 4 of a high impedance input circuit 62, 62 being a high impedance matching device for an operational amplifier 22. The output of operational amplifier 22, as produced at pin 9, is applied to a fixed resistance 63 and a potentiometer 64 with the other end of the potentiometer being tied to ground. Resistances 63 and potentiometer 64 serve as a voltage divider and the potential at their midpoint 63a is applied back to pin 8 of impedance matching circuit 62 to serve as a feedback means to stabilize the gain of amplifier 22. The output of potentiometer 64 as produced at its sliding arm is applied through a resistance 65 and thence to junction point 40.

The output of operational amplifier 22 as produced at pin 9 is applied in parallel to the input pin 1 of comparator circuits 23 and 24. The positive reference voltage input for comparator 23 is provided by the sliding arm of a potentiometer 66 which is connected between plus 6 volts terminal 66a and ground, while the negative reference input voltage for comparator 24 is provided by the sliding arm of a second potentiometer 67, this potentiometer being connected between minus 6 volts terminal 67a and ground. It can be noted that the potentiometers 66 and 67 are ganged together by a shaft means 67b so that they move in unison. The outputs of comparators 23 and 24 are applied to the emitter and base respectively of a PNP transistor 68, the collector of this transistor in turn being connected to the base of an NPN transistor 69. From transistor 69 the signal is then applied to the base of a PNP transistor 70 and the output of this device is impressed upon coils K1 and K2 of the two circuit breakers (not shown), the function of which will be described more fully hereinafter.

Looking now at the operation of the device, the tachometer generator 11 which is operated by the driving machine 10, or the starting machine, is connected to terminals 26 and 48 while the tachometer generator 16 on the driven machine 15, or the machine being started, is connected to terminals 51 and 52. Consider first the circuitry connected to terminals 26 and 48. When the tachometer generator 11 drives terminal 26 positive with respect to terminal 48 the gate of field effect transistor 36 is also driven positive. Transistor 36 is defined as a silicon N channel enhancement mode field transistor, so that when its gate is positive, the drain to source resistance is very low. Thus, capacitance 46 will be able to charge through transistor 36 to the positive 6 volts from a regulated power supply on terminal 42b.

At the same time, the base of transistor 30 will be positive and the transistor will, therefore, be in heavy conduction and its collector will be held almost at ground potential. Therefore, the gate of transistor 38 will be at 0 volts. In this condition, transistor 38 will represent a very high impedance from its drain to the power source and there will be no way for capacitance 46 to discharge through it. However, when the output from the starting machine reverses (its output is an A.C. signal for each cycle) and terminal 26 is driven negative with respect to terminal 48, the gate of field effect transistor 36 will be driven negative causing 36 to develop a high drain to source of resistance and isolating capacitance 46 from the positive 6 volts supply.

Simultaneously, the base of transistor 30 will be driven negative cutting off 30, its collector will rise to the plus 12 volts, and the gate of field effect transistor 38 will then go positive. Transistor 38 now will show a very low drain to source resistance and capacitance 46 will be connected through it to capacitance 21. Typically, capacitance 46 will be 0.01 microfarads and capacitance 21 will be 2 microfarads, making capacitance 21 very much larger than capacitance 46. Thus, the effect of this circuitry will be that a charge is developed in capacitance 21 proportional to the frequency coming from the starting machine via generator 11.

Similarly, the voltage from the driven machine 15 and its tachometer generator 16 controls the gates of transistors 41 and 44 so that capacitance 47 alternately charges from a negative voltage supply the exact value of which is determined by the tap 42a on potentiometer 42. Capacitance 47 discharges into capacitance 21. It, therefore, applies a negative charge to capacitance 21 proportional to the frequency of the driven machine 15. The ratio of capacitance 46 to capacitance 47 and the tap on potentiometer 42 are so chosen that when both machines are operating synchronously with one another, the current through the network consisting of transistor 36, capacitance 46, and transistor 38 is exactly equal to the current through the network consisting of transistor 41, capacitance 47 and transistor 44.

Under the foregoing conditions, the voltage applied to capacitance 21 will be zero. Should the machines get out of synchronism in either direction, the voltage applied to capacitance 21 will change. If the starting machine or driving machine 10, is turning faster relatively than the machine being started, that is driven machine 15, the voltage on capacitance 21 will go positive. If the reverse is the case, it will go negative. The magnitude of the voltage developed on capacitance 21 therefore will be proportional to the amount of slippage that has taken place.

Because the voltage applied to capacitance 21 is quite small, it is convenient to amplify it and this is done with integrated circuits 22 and 62 where 22 is an operational amplifier and 62 is a high impedance input circuit for the operational amplifier. Feedback taken from pin 9 of amplifier 22, the output of the operational amplifier, divided by resistance 63 and potentiometer 64, is fed back to pin 8 of high impedance circuit 62 to stabilize the gain of the amplifier. The voltage at pin 9 of the operational amplifier 22 is, therefore, proportional to the voltage across capacitance 21, but with present circuit values it is approximately 10 times as great.

This voltage is then applied to parallel connected comparators 23 and 24 where it is compared with positive and negative reference voltage determined by the settings of potentiometers 66 and 67. These settings are so chosen that they correspond to approximately one pole of slippage. When the voltage at pin 9 of amplifier 22 is closer to zero than either the voltage at the tap of potentiometer 66 or at the tap of potentiometer 67, the outputs of comparator 23 and comparator 24 are such that the emitter of transistor 68 is more positive than its base, and consequently no base current is delivered to transistor 69, which in turn delivers no base current to transistor 70, which, in turn, remains cut off.

When, however, the voltage at pin 9 of amplifier 22 moves further from zero than the voltage at either the taps of potentiometer 66 and 67, which will occur when the drive between the two machines slips approximately a pole or more, the emitter of transistor 68 will be driven negative with respect to its base. Transistor 68 will, therefore, deliver base current to transistor 69 which will deliver base current to transistor 70, which will energize output relays K1 and K2 which may be connected to trip circuit breakers (not shown) joining the armatures of the driving and driven machines.

Since at extremely low speeds some slippage is inevitable and harmless (that is, before the driven machine starts to move) a resistive means is also provided for discharging capacitance 21. This resistance 65, by adjusting the tap of potentiometer 64, appears to vary in value from its actual value (100,000 ohms in the preferred embodiment) to almost infinity since the junction 63a of resistance 63 and potentiometer 64 is essentially at the same voltage as the input on pin 4 of high impedance circuit 62. This technique has been found to be more reliable than the very high resistance potentiometer that would be required were resistance 65 to be made directly variable.

From the above description of the structure and operation of the invention, it is obvious that the disclosed loss of synchronism detector described herein provides many improvements and advancements over the undesirable and ineffective devices of the prior art. A reliable and fact acting synchronism detector is disclosed by the present invention which will effectively open the circuit breakers in the connection joining the armatures of the two machines before damage can result to either.

Obviously, many modifications and variations of the present invention are possible in the light of the above teachings. It is therefore to be understood that within the scope of the appended claims the invention may be practived otherwise than is specifically described.

I claim:

1. A system for detecting loss of synchronism between two machines comprising
   a driving machine;
   first means to generate a signal proportional to the speed of the driving machine;
   a driven machine;
   second means to generate a signal proportional to the speed of the driven machine opposite in polarity, to that of said first means;
   charging means connected to the first and second means;
   means for measuring increases in net potential across the charging means; and
   means to disconnect the machines in response to the measuring means detecting a predetermined increase in said net potential.

2. The system of claim 1 wherein the first and second means are tachometers.

3. The system of claim 2 wherein the output of one tachometer charges the charging means to one polarity and the output of the other tachometer charges the charging means to the opposite polarity.

4. The system of claim 3 wherein the measuring means comprises means for comparing the potential of one polarity of the charging means with one standard, and another means for comparing the potential of the opposite polarity with another standard.

5. The system of claim 4 further comprising first and second capacitors; and
   first and second switches activated by the respective tachometers, said switches charging the respective capacitors and then discharging them into the respective charging means.

6. The system of claim 5 wherein the switches are electron conductive devices.

7. A system for detecting loss of synchronism between two electrically coupled machines comprising
   a frequency producing means associated with each machine;
   a first charging means;
   a second charging means associated with one machine;
   a third charging means associated with the other machine;
   a first switch to energize the second charging means according to one polarity and then discharge it into the first charging means at the frequency of said frequency producing means for said one machine;
   a second switch to energize the third charging means according to the opposite polarity and then discharge it into the first charging means at the frequency of said frequency producing means for said other machine; and
   means to analyze the net potential across the first charging means.

8. The device of claim 7 wherein the first and second switches are electron conductive devices.

9. The system of claim 8 wherein the analyzing means comprises
   a first comparator for comparint the net potential with one standard; and
   a second comparator for comparing the net potential with an opposite standard.

10. The system of claim 9 further including actuator means connected to the output of the respective comparators to sever electrically the connection between the coupled machines if there is a predetermined potential on the first charging means.

11. A system for detecting loss of synchronism between two electrically coupled electro-magnetic machines comprising in combination:
    a driving electro-magnetic machine;
    a driven electro-magnetic machine;
    a first AC tachometer generator driven by said driving machine;
    a second AC tachometer generator driven by said driving machine;
    capacitor means;
    first charging means connected to said first tachometer generator, to a source of potential of a given polarity, and to said capacitor means, said charging means being adapted for providing said capacitor means with a train of charging pulses of said first polarity at a rate proportional to the speed of said first tachometer generator;
    second charging means connected to said second tachometer generator, to a source of potential of a polarity opposite to said given polarity, and to said capacitor means, said second means being adapted for providing said capacitor means with a train of charging pulses of said opposite polarity at a rate proportional to the speed of said second tachometer generator whereby the polarity and quantity of charge on said capacitor is a function of the difference of speed of the first and second tachometer generators and of said driving and driven machines;
    means for comparing said capacitor charge to preselected reference levels and providing an output signal upon a predetermined difference being attained; and
    actuator means connected to receive said output signal and electrically disrupt the connection between said coupled electro-magnetic machines upon receipt of said signal.

12. A system in accordance with claim 11 wherein each of said charging means comprises a capacitor, a source of potential of the polarity associated with said means, and a switching means adapted for connecting said capacitor alternately between said source of potential and said capacitor means at a switching rate proportional to the output frequency of the tachometer generator connected to said charging means.

13. A system according to claim 12 wherein said switching means comprises a pair of field effect transistors respectively connecting said capacitor to said source of potential and to said capacitor means, the gates of said first and second transistors being connected for alternate activation in accordance with the frequency of the output from said associated tachometer generator.

* * * * *